Figure 1:
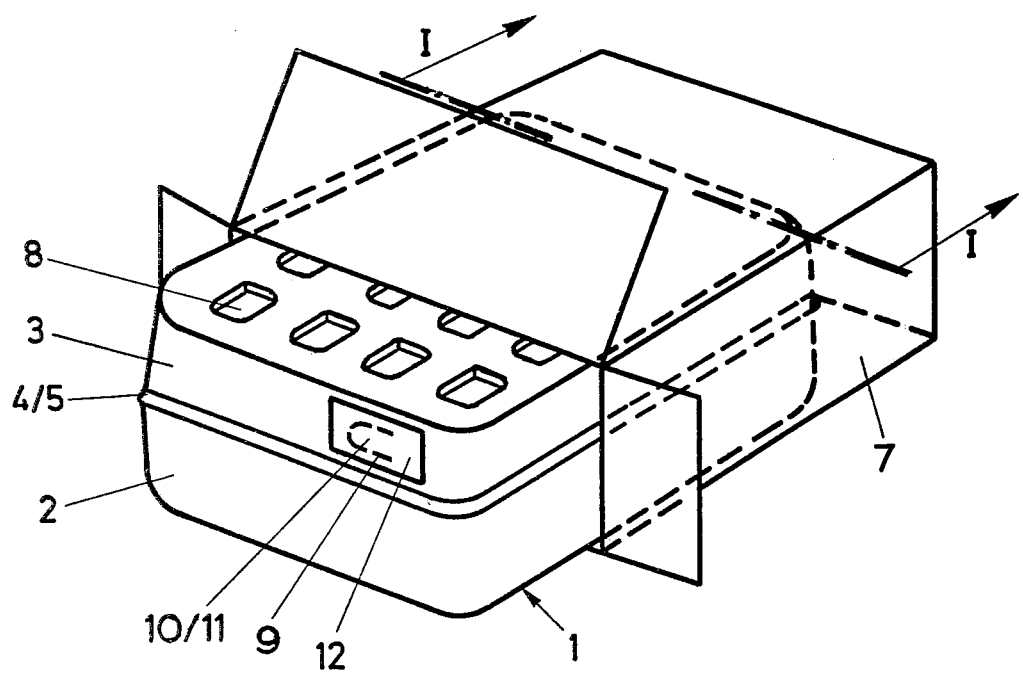

United States Patent [19]

Festag et al.

[11] 4,215,782

[45] Aug. 5, 1980

[54] NON-RETURNABLE CONTAINER, COMPRISING AT LEAST TWO DISH-SHAPED PARTS JOINED TOGETHER

[75] Inventors: Werner Festag; Hans-Ueli Müller; Oldrich Stanek, all of Schaffhausen; Peter Bähler, Seltisberg, all of Switzerland

[73] Assignees: Swiss Aluminium Ltd., Chippis; Ciba-Geigy Ltd., Basel, both of Switzerland

[21] Appl. No.: 963,416

[22] Filed: Nov. 24, 1978

[30] Foreign Application Priority Data

Nov. 29, 1977 [CH] Switzerland ............... 14580/77

[51] Int. Cl.³ .............................................. B65D 41/00
[52] U.S. Cl. ..................... 206/525; 220/75; 220/315; 220/359; 220/461
[58] Field of Search ............ 220/78, 444, 461, 359, 220/315, 76, 75; 206/525

[56] References Cited

U.S. PATENT DOCUMENTS

| | | | |
|---|---|---|---|
| 852,458 | 5/1907 | Schulz | 220/78 |
| 1,562,639 | 11/1925 | Hildebrandt et al. | 220/359 X |
| 2,798,631 | 7/1957 | Engel | 220/76 |
| 3,912,107 | 10/1975 | Baumann | 220/444 |
| 4,023,700 | 5/1977 | Buquet et al. | 220/444 |
| 4,111,330 | 9/1978 | Jordan | 220/359 X |

FOREIGN PATENT DOCUMENTS

14901 of 1910 United Kingdom ............... 220/75

*Primary Examiner*—Joseph Man-Fu Moy
*Attorney, Agent, or Firm*—Bachman and LaPointe

[57] ABSTRACT

A non-returnable container is made from at least two dish-shaped parts which have outward facing flanges joined together by a sealed seam and is intended for holding liquid and/or pasty, granular and/or powdery substances. The flanges of the dish-shaped parts, which are made of a metal-plastic composite are joined together by means of at least one sealed seam and are held in a bent position by means of a holding device.

14 Claims, 11 Drawing Figures

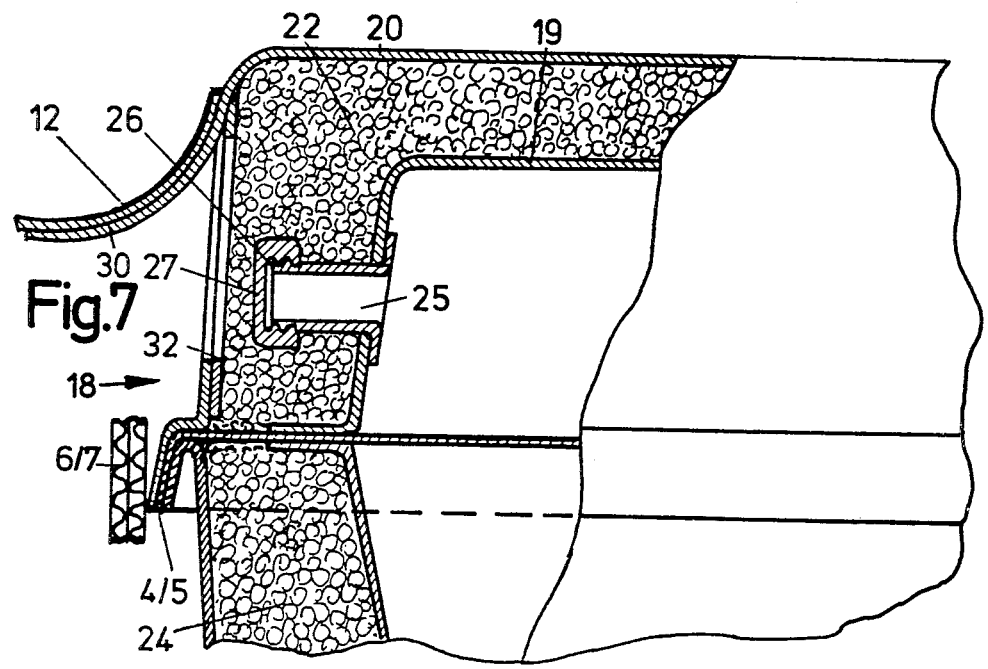
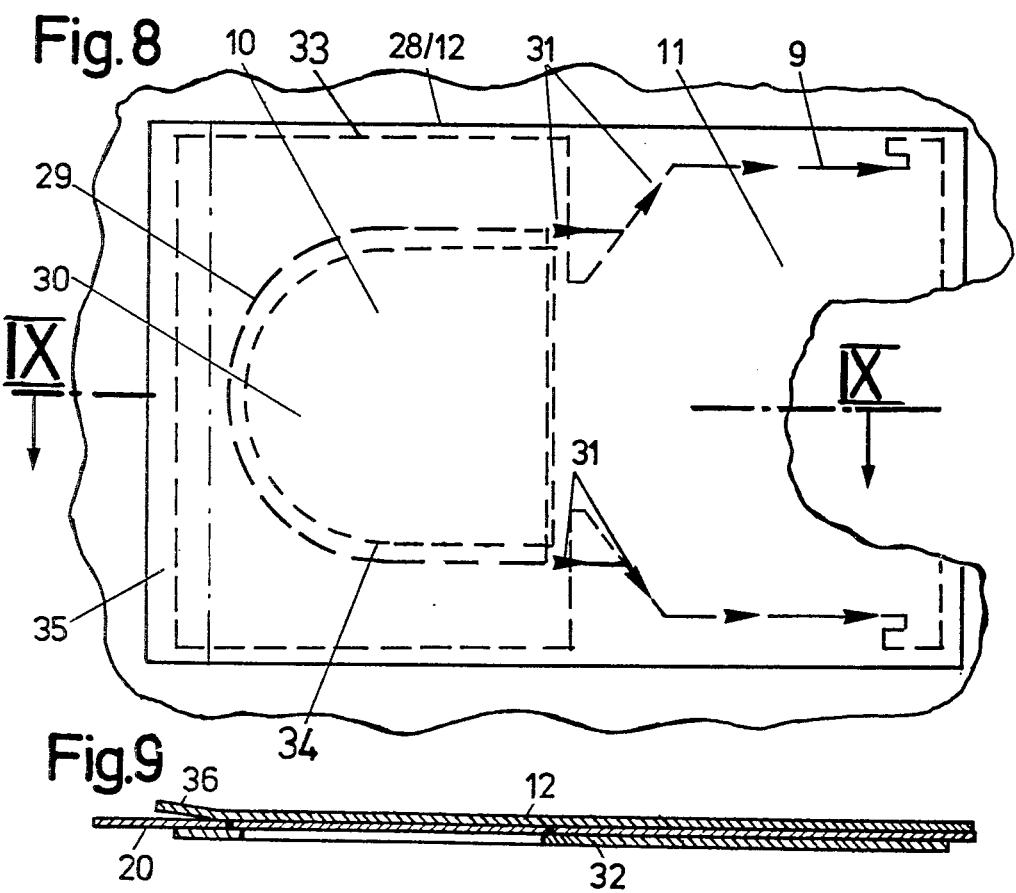
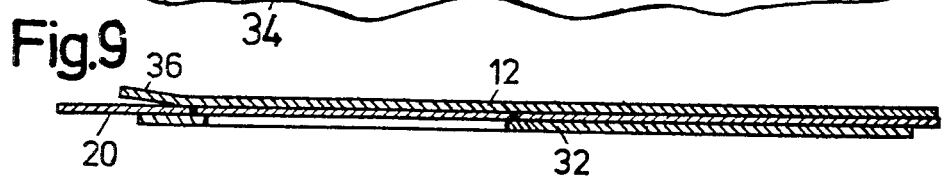

NON-RETURNABLE CONTAINER, COMPRISING AT LEAST TWO DISH-SHAPED PARTS JOINED TOGETHER

The invention presented here concerns a non-returnable container, which is made up of at least two dish-shaped parts which have outward pointing flanges joined by a sealed seam, and which is intended in particular to hold liquid and/or pasty and granular and/or powder-like substances.

A number of non-returnable containers made of metal-plastic composites and sheet or plastic are already known.

In the case of the known containers made of metal or metal-plastic composites employing at least two dish-shaped parts, it has been shown to be a disadvantage that these containers, which usually have a flanged edge, have to be made relatively thick-walled at considerable expense in order to be able to absorb the pressure and surging of the contents normally occurring during transport.

The non-returnable containers made of tin plate such as, for example, barrels, canisters, drums and the like suffer basically from the disadvantage that these can not be completely emptied, and after use are difficult to destroy or dispose of since such containers (often containing poisonous residues) have to be made, at considerable expense, relatively thick-walled in order to be able to withstand the surging and pressure of the contents normally occurring during transport. Also the plastic non-returnable containers are in many cases unsuitable for holding liquid and/or pasty substances such as, for example, chemicals as such chemicals diffuse through the plastic and cause it to swell and, on the other hand, do not provide sufficient protection against oxygen and moisture. Furthermore such non-returnable containers made of plastic cause considerable difficulties if they are to be compressed and disposed of.

The non-returnable containers of the above described kind suffer in general from the basic disadvantage that they are not suitable for the transport of substances because of difficulties arising in the disposal and/or dumping of the container in question.

The object of the invention is to develop a non-returnable container of the kind described at the start, by means of which the previously described disadvantages of the known non-returnable containers are avoided and a relatively small amount of material is required for its manufacture.

This object is solved in terms of the invention in that the flanges of the dish-shaped parts made of a metal-plastic composite are joined by means of at least one sealed seam and are held in a bent position with the aid of a holding device. This bending over of the flange can at least be started in an early, special work step, and the further bending over until flat can be carried out when applying the holding device on the container.

Usefully, the device for holding can comprise a protective package made of cardboard or pre-shaped foamed material and, furthermore, is in the form of a ring to keep the sealed flanges of the dish-shaped parts of the non-returnable container in a bent position.

It is within the scope of the invention that the non-returnable container can be in the form of a multi-chamber container.

To provide a non-returnable container for dangerous substances which is particularly safe and impact resistant, it has been found favorable to insert between a non-returnable container made of two dish-shaped parts a single or multi-chamber container, the chambers between the inserted single or multi-chamber container and the outer container being intended to accommodate absorbent, neutralizing or shock absorbent materials.

It has been found particularly favorable to construct the non-returnable container out of an aluminum-plastic composite, the aluminum foil or strip of the composite being 10–250 $\mu m$, preferably 20–160 $\mu m$ thick.

Usefully the non-returnable container is provided with an opening for filling and emptying which can be adjusted in size, and can be opened and closed by means of an adhesive strip covering the said opening.

Further advantages, features and details of the invention will be disclosed in the following description of preferred embodiments of the invention with the help of simplified drawings viz., FIG. 1: A first embodiment of the non-returnable container shown in a perspective view.

Figure 2:
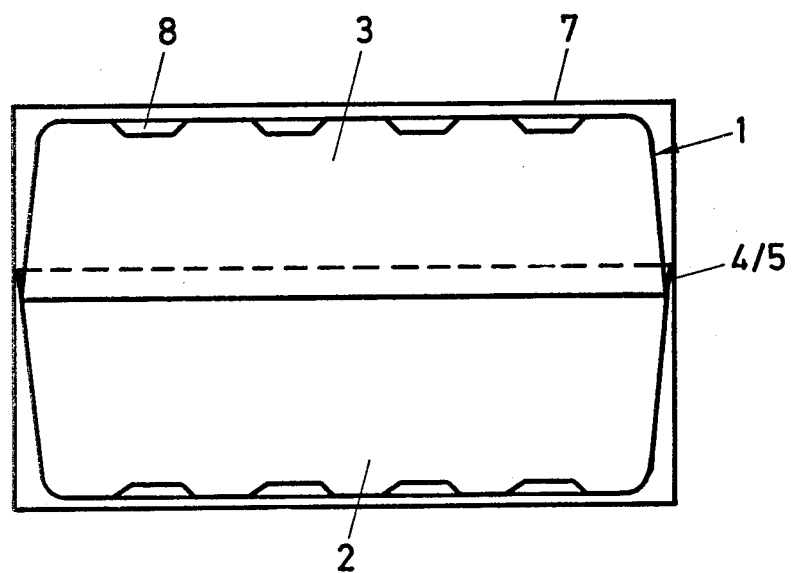

FIG. 2: A cross section through the container shown in FIG. 1 along the line I—I in FIG. 1, and on a larger scale.

Figure 3:
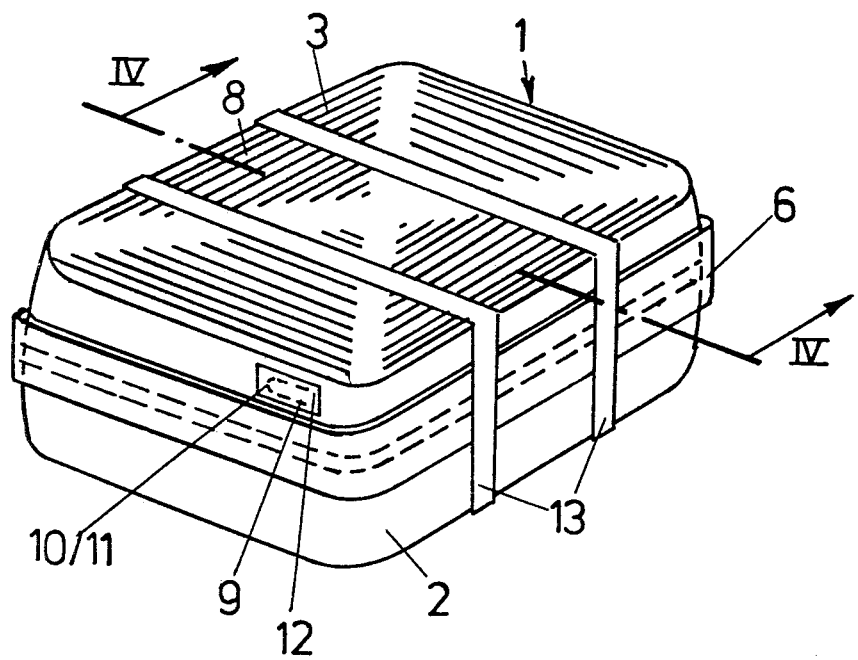

FIG. 3: A second embodiment of the non-returnable container shown in a perspective view.

Figure 4:
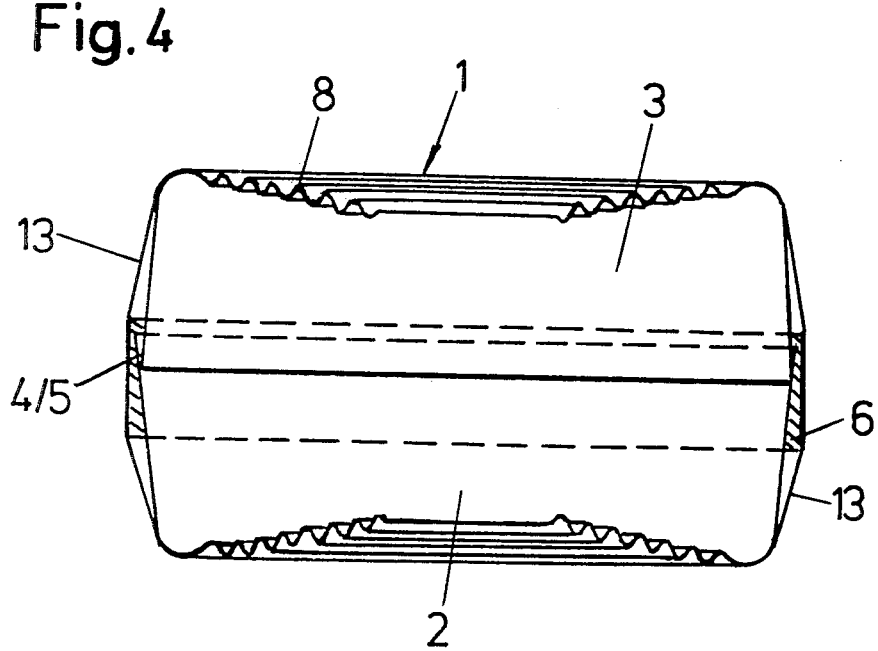

FIG. 4: A cross section through the container shown in FIG. 3 along line IV—IV in FIG. 3, and on a larger scale.

Figure 5:
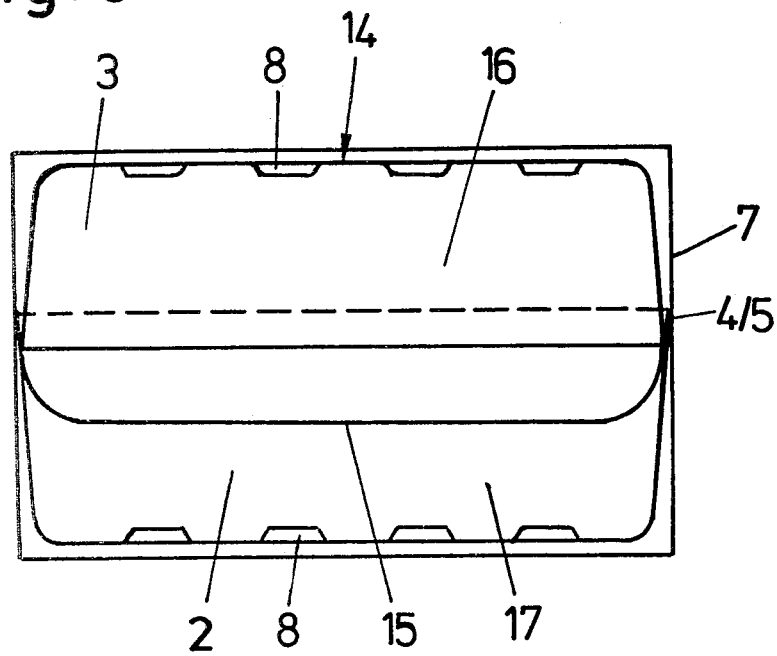

FIG. 5: A cross section through a third embodiment of the container of the invention, in this case having two chambers.

Figure 6:
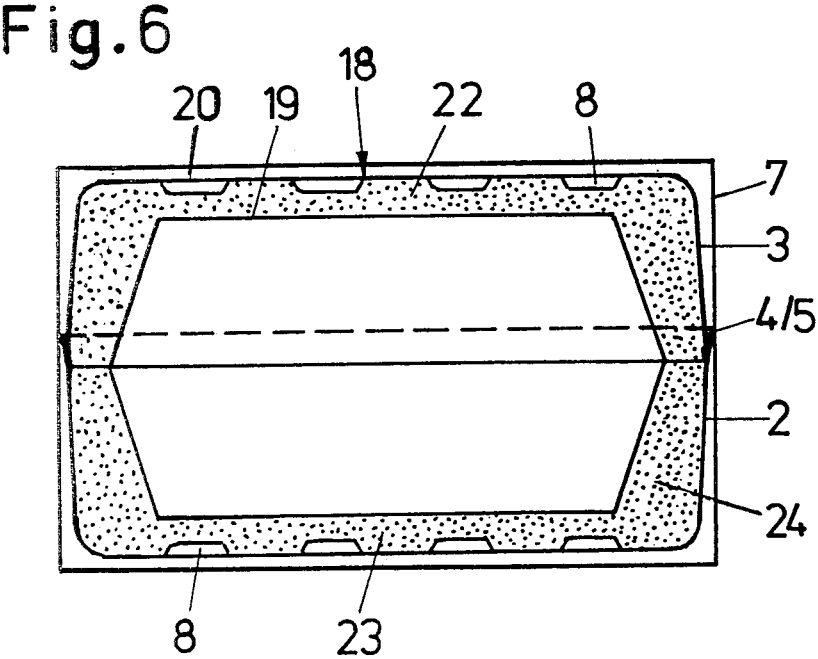

FIG. 6: A cross section through a fourth embodiment of a single or double chamber, non-returnable container which is accommodated by a larger container and is particularly resistant to mechanical shock.

FIG. 7: A section through a filling and emptying opening in a fourth exemplified embodiment of a non-returnable container which has one or two chambers to hold the contents.

FIG. 8: A view of a filling and emptying opening in the container shown in FIGS. 1, 3 and 5 describing the exemplified embodiments of FIGS. 1, 2 and 3.

FIG. 9: A section through a filling and emptying opening in the container shown in FIG. 8, the section being along line IX—IX in FIG. 8.

Figure 10:
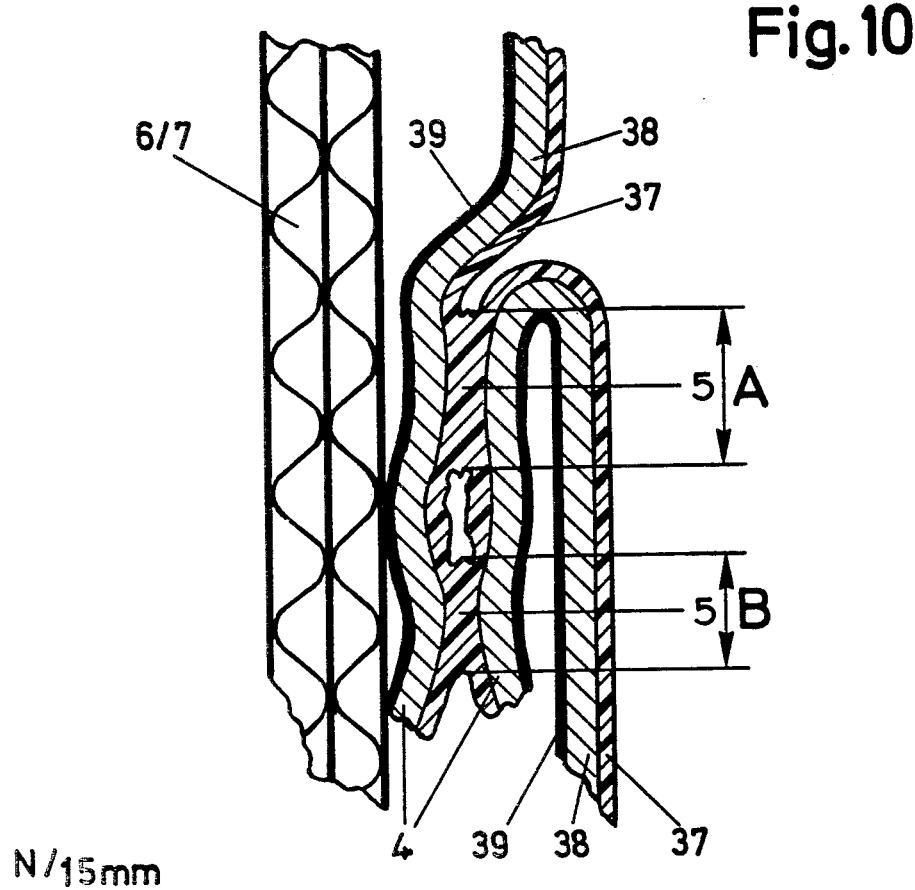

FIG. 10: A cross section through both flanges (joined by a sealed seam) of both dish-shaped parts of the non-returnable container as in the first, second and third exemplified embodiments, but on a larger scale than in FIGS. 1, 3 and 5.

Figure 11:
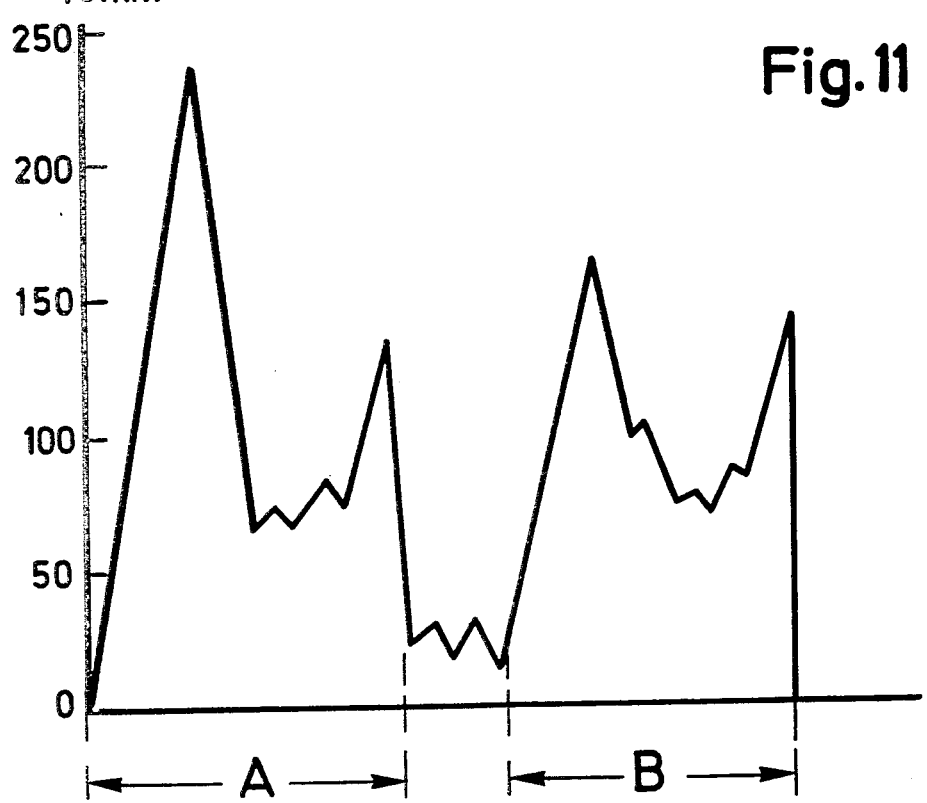

FIG. 11: A diagram illustrating the peel strength of the sealed seam of the flange, which is formed by the edges of the two dish-shaped parts, and which is held in the bent position.

Further, table I lists the results from compression testing and drop testing in accordance with the IMCO test specification for sea transport.

FIGS. 1–6 show four exemplified embodiments of non-returnable containers 1 which are made out of a metal-plastic composite in the form of at least two dish-shaped parts 2,3 with outward facing flanges 4 which are joined together by at least one sealed seam 5 and are bent, wherein at least the flanges 4 are held in a bent-over position by a device which can for example be in the form of a ring 6 or protective packaging 7.

As shown in FIGS. 1 and 2, the first exemplified embodiment of a non-returnable container 1, the device for holding the flanges 4 of the container bent-over is a commercially available, protective box-shaped packaging 7 which is preferably made out of cardboard and is so dimensioned that the flanges 4 of the container are kept in an acutely bent position, after the container has been pushed inside the carton 7. Both dish-shaped parts 2 and 3, which are made of a metal-plastic composite, are provided with corrugations 8 such as creases or grooves which stretch when the container is subjected to large loads, for example due to surging of the contents i.e. on impact after a fall, and thus provide support to the outer sidewall of the container along the inner sidewall of the protective packaging 7. One of the two dish-shaped parts 2 or 3 of the container is provided with previously conceived cut and tear lines 9 which are used to create openings 10 and 11 for filling and emptying; these openings can be closed up again by means of an adhesive foil 12. A more detailed description of the openings for filling and emptying is provided below in connection with the description of FIG. 8.

The protective packaging 7 around the container 1 is preferably made from a material which is sufficiently rigid to be able to keep in a bent position the outward facing flanges 4 of the dish-shaped parts 2 and 3 held together by the sealed seam 5, as a result of which excessive stressing of the sealed seam 5 or separating forces acting on the seam 5 are avoided. Instead of cardboard use can be made, for example, of the now quite familiar pre-shaped foam molds for example made of polystyrene, which provide the container with particularly good protection against impact. In addition such molded forms of foamed plastic provide thermal insulation, which is of advantage when transporting goods which are sensitive to heat.

In the case of the two exemplified embodiments of a non-returnable container 1 shown in FIGS. 3 and 4 a device for holding the flanges 4 of both halves 2 and 3 in a bent position is in the form of a packing ring 6, which is preferably made of stretched plastic and holds the outward facing flanges 4 of the non-returnable container 1 around the container at an angle preferably at an acute angle. Two or more endless, preferably stretched plastic, strips 13 are provided around the container and over the ring 6 to provide some support to the shape of the container 1.

FIG. 5 shows a third exemplified embodiment of a two-chamber, non-returnable container 14 which is particularly suitable for the transport of multi component systems such as two component adhesives, casting resins or lacquers. For example, previously weighed amounts of individual components can be transported in a single container of this kind. It is possible here to adjust the ratio of volumes of the chambers to almost any desired level as required by the ratio of substances which have to be mixed.

The two-chamber container 14 has a dividing wall 15 which is in the form of a flat metal strip coated on one or both sides with plastic, or is drawn to various depths, and is sealed into place; this allows the required volumes to be obtained as required by the products or the application in question. The chambers 16 and 17 can be provided with filling and/or emptying openings 10 and 11 which are described in greater detail later in connection with FIG. 8. The two-chamber container 14 can be boxed the same way as the container 1 in FIGS. 1 and 3.

FIG. 6 shows a fourth exemplified embodiment of the invention viz. a non-returnable container 18 which allows the possibility of transporting and storing very dangerous chemicals in a single or multi-chamber container unit 19. For this embodiment a single or multi-chamber inner container 19 is enclosed in a first outer container 20 made of two dish-shaped parts 2 and 3, the inner container being the same as the outer container except for the corrugations in the bottom and top of the outer container as viewed in FIG. 6. The chambers 22 and 23 situated between the inner single or multi-chamber unit 19 and the outer container 20 accommodate absorbent neutralizing and impact absorbent materials such as, for example, foamed material 24, amorphous silica or chalk.

In the sectioned part of a non-returnable container shown in FIG. 7 there is a tubular piece 25 which connects up at one end to a single or multi-chamber unit 19 and at the other end is provided with a thread 26 onto which a closing cap 27 can be screwed. The cap 27 is usefully covered over with impact resistant, absorbent material 24, which can be removed in a simple manner from the cap 27 after pulling back the adhesive foil 12 on the container 20, in order to have access to the cap 27.

The inlet and outlet opening 10 and 11 shown in FIGS. 8 and 9 are designed such that a relatively small opening 10 is provided, by means of which the container can be filled with highly viscous substances, for example by means of conventional filling units using pressure and elevated temperature, the opening 10 being closed afterwards preferably by means of an adhesive aluminum strip 12.

In FIG. 8 the adhesive aluminum strip 12 on the outside of the container is indicated by the thick line 28. The coarse broken line 29 indicates a cut in the wall of the container and shows the contour of a tonque 30. The previously mentioned tear line 9 connects up with the coarse broken line 29 as shown by the arrows 31 and matches the contour of a strengthening foil 32 stuck or sealed on to the inside of the container or dish-shaped part. The outer and inner contours of the strengthening foil are indicated by the fine broken lines 33 and 34, the line 34 indicating an opening in the strengthening foil 32, which opening is smaller than the opening formed in the sidewall by the cut line 29 of the tongue 30. The reinforcing foil therefore projects out beyond the cut edge 29 of the container wall and forms a backing for the tongue 30.

The adhesive foil 12 stuck on to the outside or a dish-shaped part of the container is provided with a non-adhesive area 35 which forms a flap 36 for gripping. On tearing back the adhesive foil 12 on this flap 36, the tongue 30 is raised first and the opening 10 exposed. By continuing the tearing action the outlet opening 11 is formed in that the wall of the container 20 or a dish-shaped part of the same of ruptured along the tear line marked with the arrows 31 and predetermined by the strengthening foil.

When the container is not emptied completely it is to advantage possible to close it again in that the self-adhesive foil 12 can be stuck down to cover both openings 10 and 11 in the container or in one of the dish-shaped parts of the same. There are other known devices which can be provided at the opening to open and close it, if this is desired.

FIG. 10 shows a cross section through the two flanges 4 of the dish-shaped parts of a container which are joined by a sealed seam, and it can be seen that a plastic layer of the metal-plastic composite used for the non-returnable container is always on the inside of both dish-shaped parts. It can also be seen how the flanges 4 are bent and held in the bent position with the help of the device 6 or 7. Here the metal-plastic composite comprises a metal foil clad with plastic on both sides, in fact with a sealable plastic layer 37 on the inside of the container, metal foil 38 for example made of aluminum, and on the outside of the container a nonsealable, heat resistant layer 39 of plastic or lacquer. In this connection it should be specially mentioned that the metal-plastic composite can also be coated with sealable plastic on only one side of the container, i.e. the innermost side, if this is desired. In this advantageous embodiment of the invention the flanges 4 are joined by means of two sealed seams 5A and B which are spaced apart from one another.

From the diagram shown in FIG. 11 it can be seen that the peel strength of the double seam 5—as in FIG. 5—of a 15 mm wide strip, measured in Newtons, is particularly large when flange 4 is held in an almost flat, bent position: The sealed seam 5A exhibits a maximum resistance of about 240 N/15 mm and seam 5B about 150 N/15 mm. The peel strength of the flat bent flange 4 is therefore much greater than that of a flange not held in a bent-over position. For comparison purposes, using the same metal-plastic foil the peel strength of the latter would amount to approximately 130 N/15 mm.

With respect to the thickness of the metal-plastic composite employed it should be pointed out in particular that in most cases this lies below a range in which two dish-shaped parts can be joined reliably by means of a double flanged seam—this thickness is within a certain range also dependent on the metal used in the metal-plastic composite. In most cases the thickness of the metal strip used for double flanged seams is over 250 $\mu$m, since experience has shown that the double flanged seam formed with a metal strip of less than 250 $\mu$m thickness in the metal-plastic composite does not meet the requirements in terms of stability and air tightness made of a container.

In contrast the particularly advantageous manner of joining two dish-shaped parts in terms of the invention allows the use of 10 to 250 $\mu$m thick metal foil in the metal-plastic composite.

The thickness of metal-plastic composite which are employed depend within a certain range also on the size of the container to be manufactured. The preferred range of thickness of aluminum foil or strip used for the aluminum-plastic composite container of the invention is between 20 and 160 $\mu$m. The structure of aluminum-plastic composite chosen for the non-returnable container can be usefully selected to comply with many different requirements.

For very aggressive contents—solvent containing, corrosive products such as synthetic resins, dispersions with a pH of 2 to 10—the following structure was chosen (described here from the outside to the inside of the container):

phenolic resin - epoxy - baked lacquer/Al 110–160 $\mu$m/baked lacquer 5–10 g/m$^2$/polyamide 12, 20–30 $\mu$m. Instead of PA 12 one can also consider PA 6; PA 6,6; PA 6,8; PA 6,10 and PA 11 for this application.

For contents which are not corrosive and do not cause swelling the following aluminum-plastic laminates would be suitable:

Al/adhesive/polypropylene (PP)
Al/adhesive/polyethylene (PE)
Al/PP - acrylic acid - co-polymer
Al/PE - acrylic acid - co-polymer
Al/polyamide 6,6
Al/polyamide 11

Also in the case of this structure of course an outer and/or inner lacquer coating can be provided on the aluminum. The following materials for example are suitable for holding the flanges of the container in a bent position and as protective packaging for the metal-plastic composite:

cardboard, single or multi-layered board with corrugations in the various layers wood, plywood (glued), thermoplastic (sprayed or deep drawn), reinforced plastics (e.g. fibreglass reinforced plastic on the basis of polyester or epoxy resin)

hard, foamed materials made of polyurethane (PUR) or polystyrene (PS)

in the case of special packaging it is also possible to foam hollow spaces between the metal-plastic composite container, for example using polyurethane.

If the flanges of the container are to be held in a bent position—for example by partly enclosing the container, the following materials can also be used:

stretched wrap round strips made of plastic, for example polyester or polypropylene stretched self-adhesive strips, such as polyester or polypropylene shrink-foils, which shrink for example after the application of heat.

The invention is not restricted to the use of the above choice of materials. It is also conceivable that, for example, other suitable materials are mentioned here could be employed. Furthermore, it should be mentioned in particular that it is within the terms of the invention that other means of holding the flanges 4, but not described here, can be employed if desired.

The non-returnable container of the invention is very economic to produce because of the relatively small amount of material required for it. Further advantages are that, after partially emptying the container, it can be closed again and is easy to handle. Furthermore, the container can be completely emptied by pouring out the contents and afterwards can be compressed to a very small volume. It is then easy to dispose of and finally can be completely destroyed by combustion in a waste disposal plant.

In connection with the tests carried out in accordance with the IMCO regulations (International Government Maritime Consultative Organization/London), the results of which are listed in table I, it should be pointed out that the high standards specified for such containers are not usually required in practice, and the container is seldom filled to the uppermost level with only water, i.e. to 98% of the maximum volume.

Looking at table I from left to right, column 1 lists the laminate structure of the aluminum composite of the containers subjected to testing.

Column 2 lists the details of structure of the protective packaging which has both a protective function and also serves to hold the flange of the container in a bent position. In connection with this it should be noted that in the fourth and eighth test—see column 6 on the right from top to bottom—for example, no holding device and no protective package is provided for the flange of the container.

Column 3 lists the maximum capacity of a container expressed in liters.

The maximum bursting force that a container filled with water can withstand is expressed in "bar" units in column 4.

Column 6 indicates the number of times the filled container could be dropped before leakage of the contents occurred. In the 4th and 8th drop test, for example, a container with no holding device or protective packaging for the flange was tested to show that the container of the invention, compared with containers without a holding device to support the flanges and made of the same material, with same laminate structure and of same size dropped from the same or lesser height, can withstand dropping much better than containers without a holding device to support the flanges.

Table I

Bursting force and drop test in accordance with the IMCO regulations for sea transport

| Laminate structure of composite for the container | Type of protective packaging and holding device | max. capacity (l) | Bursting force (bar) | drop height (m) for container filled with water | No. of drops without leakage |
|---|---|---|---|---|---|
| Al 140 / PA 20 | single corrugated cardboard 120 g/m² thickness: 4,5 mm | 8,5 | 0,6–0,7 | 1.20<br>1.80 | 5<br>2 |
| Al 140 / PA 30 | single corrugated cardboard 120 g/m² thickness: 4,5 mm | 8,5 | 0,9–1,1 | 1.80 | 4 |
| Al 140 / PA 30 | no holding device | 8,5 | 0,5–0,6 | 1.20 | 0 |
| Al 140 / PA 30 | double corrugated cardboard 150 g/m² thickness: 6,5 mm | 28 | 0,8–1,0 | 1.20 | 3 |
| Al 160 / PA 30 | double corrugated cardboard 150 g/m² thickness: 6,5 mm | 28 | 0,8–1,0 | 1.20 | 4 |
| Al 160 / PA 30 | double corrugated cardboard 150 g/m² thickness: 6,5 mm | 28 | 0,9–1,1 | 1.80 | 2 |
| Al 140 / PA 30 | no holding device | 28 | 0,5–0,6 | 0.80 | 0 |

What is claimed is:

1. A non-returnable container made from at least two dish-shaped parts which have outward facing flanges joined together by a sealed seam, said container being useful in particular for holding liquid, pasty, granular or powdery substances, wherein the dish-shaped parts are made from a metal-plastic composite and in which the said flanges are joined together by means of at least one sealed seam and are held in a bent position by means of a holding device but are not permanently deformed, wherein said holding device is sufficiently rigid to be able to keep said flanges in a bent position as a result of which excessive stressing of the sealed seam or separating forces acting on the seam are avoided.

2. A non-returnable container according to claim 1 in which the holding device comprises protective packaging, the sidewalls of which rest in close contact against the bent, sealed flanges of the dish-shaped parts of the container.

3. A non-returnable container according to claim 1 in which the holding device comprises a ring holding the bent flanges around the whole of the container.

4. A non-returnable container according to claim 1 in which the holding device is a pre-shaped, foamed material.

5. A non-returnable container according to claim 1 in which the container is in the form of a multi-chamber container.

6. A non-returnable container according to claim 1 wherein a single or multi-chamber inner container is inside said container made from two dish-shaped parts which is the outer container, wherein said inner and outer containers define chambers therebetween, said chambers containing absorbent, neutralizing and shock-absorbent materials.

7. A non-returnable container according to claim 6 wherein both inner and outer containers are made from two dish-shaped parts.

8. A non-returnable container according to claim 1 wherein said container is made of an aluminum-plastic composite.

9. A non-returnable container according to claim 8 wherein the aluminum component of the aluminum-plastic composite is a foil or strip 10–250 μm thick.

10. A non-returnable container according to claim 9 wherein the aluminum component of the aluminum-plastic composite is a foil or strip 20–160 μm thick.

11. A non-returnable container according to claim 1 wherein said flanges of the dish-shaped parts are joined together by two of said sealed seams around the container, wherein said seams are spaced apart from one another and are completely separate from each other.

12. A non-returnable container according to claim 1 wherein said plastic is on the inside of each of said dish-shaped parts.

13. A non-returnable container according to claim 1 including an outside, heat resistant, non-sealable layer of said metal-plastic composite.

14. A container according to claim 1 in which said flanges are joined together by means of at least one sealed seam of plastic from each of said dish-shaped parts sealed together in a plastic-to-plastic bond.

* * * * *